Patented Aug. 5, 1952

2,606,202

UNITED STATES PATENT OFFICE 2,606,202

MONOSULFURIC ACID ESTERS OF POLYALKYLENE GLYCOLS

Hans Z. Lecher, Plainfield, and Tsai Hsiang Chao, Bound Brook, N. J., assignors to American Cyanamid Company, New York, N. Y., a corporation of Maine No Drawing. Application December 8, 1948, Serial No. 64,243

6 Claims. (Cl. 260—458)

This invention relates to monosulfuric esters of polyalkylene glycols and to a process for their preparation.

Polyalkylene glycol monosulfuric acid esters have never been prepared successfully although the monosulfuric acid ester of an unpolymerized glycol such as ethylene glycol is known. When it is attempted, however, to prepare the monosulfuric acid esters of polyalkylene glycols by esterification of the glycols with sulfuric acid useless mixtures are obtained which contain unreacted glycol, mono and disulfuric esters, sulfuric acid, water and the like. The reaction is practically impossible to control as the water produced in the reaction progressively dilutes the sulfuric acid. When it is attempted to remedy this defect as in the ordinary methods of esterifying aliphatic alcohols with sulfuric acid namely by using an excess of acid the diester is prepared and isolation difficulties are so great as to render such a precedure practically worthless. The constituents of the mixture are all of such nature and fractional distillation is not practicable. As a result although polyalkylene glycol monosulfuric esters have long been desired, there has been no means of producing them practically.

According to the present invention we have found that monosulfuric esters of polyalkylene glycols particularly of polyethylene and polypropylene glycols may be prepared smoothly and with no serious by-product formation by reacting the polyethylene glycol with the sulfur trioxide addition product of a tertiary amine. We do not know why this process proceeds smoothly and easily and none of the difficulties are encountered which makes attempts to prepare the products by straight esterification with sulfuric acid impractical. It is, therefore, not desired to limit the present invention to a particular theory of how the sulfur trioxide addition products of amines react.

It is an advantage of the present invention that almost any sulfur trioxide addition product of a tertiary amine may be used, for example, addition products of amines such as trimethylamine, triethylamine, the tripropylamines, the tributylamines; unsaturated straight chain amines, such as triallylamine; aralkylamines such as dimethylbenzylamine and diethylbenzylamine; alicyclic amines such as cyclohexyldimethylamine; aromatic amines such as dimethylaniline and diethylaniline; and heterocyclic amines such as N-methylmorpholine, pyridine, and N-ethylpiperidine.

The reaction of the present invention may be carried out using the polyalkylene glycol itself as a reaction medium. Sometimes it is desirable to use a solvent, and here the choice of solvents is a very wide one. Almost any solvent which does not react with the sulfur trioxide addition product may be employed. Examples of such solvents are ethylene dichloride, mono- and dichlorobenzenes, tertiary amines such as pyridine or dimethylaniline, benzene, and the like. It is sometimes advantageous to choose a solvent having a boiling point at the reaction temperature desired, so that the temperature may be maintained by refluxing.

The process of the present invention is not particularly critical as to temperature. In general, temperatures from room temperature up to the decomposition temperature of the amine-sulfur trioxide compound may be used. Temperatures higher than 140° C. result in decomposition of most of the sulphur trioxide-amine addition products and are, therefore, less desirable. On the other hand, as with most reactions, the speed of reaction increases with temperature and we prefer, therefore, to work in a range of 50°–110° C.; temperatures around 100° C. are very suitable and constitute a desirable, practical operating condition.

It is desirable to be sure that the reaction is carried to practical conclusion, and a very simple test can be used to determine this point. This test involves refluxing a sample of the reaction mixture with water and determining the acid formed. Any unreacted amine-sulfur trioxide present is hydrolyzed to the acid sulfate; however, the esters are stable and therefore the completion of the reaction can be determined by the point at which refluxing with water does not produce any acidity. When operating with a solvent, the solvent may be removed after reaction is complete, and in any event, the monosulfuric ester is obtained in the form of its tertiary amine salt in almost quantitative yield and with a high degree of purity.

The properties of the tertiary amine salts of these monoesters vary with the length of the polyalkylene oxide chain; in general, the low molecular weight salts are liquids, and those of higher molecular weight are solids. The salts themselves are convenient to handle and are a useful form of the monosulfuric esters. However, if for some particular purpose it is desired to isolate the ester acid, this can be done by treatment with barium hydroxide to liberate the amine, followed by precipitation of the barium with an equivalent amount of sulfuric acid.

Filtration of the barium sulfate leaves the pure monosulfuric ester in water solution, from which it may be obtained by evaporation.

Experiment has shown that this invention is applicable to polyalkylene glycols of average molecular weight from 190 to approximately 6000, producing monoesters of molecular weight from 270 to 6100.

The monosulfuric esters of the present invention and their amine salts are useful intermediates, in which polyglycol chains of predetermined length are found in a readily available form. For example, by reaction with an alkali chloride, the esters are converted to the corresponding polyethylene or polypropylene glycol chlorohydrins. Or, the free hydroxyl group in the molecule may be subject to various reactions such as acylations, from which the sulfated hydroxyl is blocked. By means of such reactions, the polyglycol monosulfuric esters may be converted to important families of compounds which are useful as surface active agents, dyeing assistants, and in other ways.

The invention is illustrated in the following examples. Parts are by weight.

Example 1

The addition compound of triethylamine and sulfur trioxide is stirred and heated at 100° C. for approximately one hour with an equimolecular amount of polyethylene glycol, of molecular weight respectively 200, 300, 400, or 600. The respective products are water-soluble viscous liquids which give neutral aqueous solutions that generate no appreciable acidity on refluxing, indicating completion of the reaction.

Example 2

The procedure of Example 1 is followed substituting the sulfur trioxide addition product of trimethylamine for the corresponding addition product of triethylamine. Reaction proceeds in the same manner, and the trimethylammonium salts are obtained in almost quantitative yield.

Example 3

Triethylamine-sulfur trioxide is reacted with an equimolecular amount of a solid polyethylene glycol of average molecular weight 1500, 1540, 4000, or 6000, respectively, following the method of Example 1. Each product is a waxy solid at room temperature.

Example 4

A mixture consisting of equimolecular quantities of triethylamine-sulfur trioxide and polypropylene glycol of molecular weight 400 is refluxed in approximately its own weight of ethylene dichloride, until esterification is complete. The solvent is evaporated and the triethylammonium salt of the monoester is obtained as viscous liquid.

Example 5

A solution of 15.8 parts of $Ba(OH)_2 \cdot 8H_2O$ in 150 parts of water is added to 24.0 parts of the triethylammonium salt of the monosulfuric ester of polyethylene glycol of molecular weight 300. The solution is allowed to evaporate until amine odor is no longer discernible. The solution is then diluted with water and the barium precipitated by the addition of a slight excess of 5 N sulfuric acid. The barium sulfate is filtered and the filtrate is evaporated to yield the viscous monosulfuric ester as the residue. Analysis by titration shows that very little hydrolysis has occurred.

Example 6

Equivalent quantities of pyridine-sulfur trioxide addition product and of the polyethylene glycol of molecular weight 200 are mixed, causing evolution of heat and almost immediate solution. The mixture is then heated at 90°–100° C. for two hours. Titration shows the reaction to be substantially complete. The product is a viscous liquid.

Example 7

Equimolecular quantities of the sulfur trioxide addition product of N-ethylmorpholine and polyethylene glycol of molecular weight 200 are heated at 150° C. for two hours. Titration shows practically complete esterification. The product is a viscous liquid.

We claim:

1. A process of producing a monosulfuric ester of a polyalkylene glycol which comprises reacting a polyalkylene glycol of an average molecular weight from 190 to 6000 in a non-aqueous medium with a tertiary amine sulfur trioxide addition compound in an amount sufficient to produce the monosulfuric ester maintaining the reactants in intimate contact at a temperature between room temperature and the decomposition temperature of the amine sulfur trioxide addition product until said addition product is substantially completely consumed.

2. A process according to claim 1 in which the reaction temperature is between 50 and 115° C.

3. A process according to claim 2 in which the polyalkylene glycol is a polyethylene glycol.

4. A process according to claim 2 in which the polyalkylene glycol is a polypropylene glycol.

5. A process according to claim 1 in which the polyalkylene glycol is a polyethylene glycol.

6. A process according to claim 1 in which the polyalkylene glycol is a polypropylene glycol.

HANS Z. LECHER.
TSAI HSIANG CHAO.

REFERENCES CITED

The following references are of record in the file of this patent:

UNITED STATES PATENTS

| Number | Name | Date |
|---|---|---|
| 2,147,785 | Cupery | Feb. 21, 1939 |
| 2,268,443 | Crowder | Dec. 30, 1941 |
| 2,520,733 | Morris et al. | Aug. 29, 1950 |

FOREIGN PATENTS

| Number | Country | Date |
|---|---|---|
| 390,023 | Great Britain | Mar. 30, 1933 |